United States Patent [19]

Yang

[11] Patent Number: 4,978,202
[45] Date of Patent: Dec. 18, 1990

[54] LASER SCANNING SYSTEM FOR DISPLAYING A THREE-DIMENSIONAL COLOR IMAGE

[75] Inventor: Keun Y. Yang, Seoul, Rep. of Korea

[73] Assignee: Goldstar Co., Ltd., Seoul, Rep. of Korea

[21] Appl. No.: 351,049

[22] Filed: May 12, 1989

[51] Int. Cl.⁵ .......................... G02F 1/13; H04N 9/31
[52] U.S. Cl. .................. 350/331 R; 340/766; 350/334; 358/60; 358/231
[58] Field of Search ............ 350/331 R, 334, 330; 340/766, 783; 358/47, 48, 231, 60, 63; 455/23

[56] References Cited

U.S. PATENT DOCUMENTS

| | | | |
|---|---|---|---|
| 4,611,245 | 9/1986 | Trias | 358/231 X |
| 4,681,427 | 7/1987 | Plummer | 355/32 |
| 4,836,649 | 6/1989 | Ledebuhr et al. | 350/331 R |

*Primary Examiner*—Stanley D. Miller
*Assistant Examiner*—Huy K. Mai

[57] ABSTRACT

A laser scanning system includes a read light emitting member, a green light emitting member, a blue emitting member, a scanning light member, and a controller. The red, green and blue emitting light members include an optical-frequency modulator and a liquid crystal plate placed between polarized light plates. The polarized light plates are disposed at an angle equal in the polarized light direction. This enables the viewer to use polarized glasses to view a three-dimensional color image on screen produced by the laser scanning system.

5 Claims, 2 Drawing Sheets

LASER SCANNING SYSTEM FOR DISPLAYING A THREE-DIMENSIONAL COLOR IMAGE

BACKGROUND OF THE INVENTION

1. Field of the Invention

The present invention relates to a laser scanning system for displaying a three-dimensional color image and more particularly, to a laser scanning system which displays a three-dimensional color image on a screen by utilizing a laser scanning method which enables the operator to view and rotate the color image three-dimensionally.

2. Description of the Prior Art

Several types of laser systems for displaying a color image are known in the art and have a plurality of disadvantages associated with them. Such disadvantages are, for example, that laser scanning system can only display color image in a two-dimensional format. These systems do not utilize the property of polarized light associated with the laser beam so that the operator can view the image three-dimensionally.

SUMMARY OF THE INVENTION

Accordingly, it is an object of the present invention to an improved laser scanning system for displaying a three-dimensional color image.

Another object of the present invention is to provide a laser scanning system which transmits the laser beam in one dimension and uses the property of polarized light associated with the laser for forming a three-dimensional image on a screen.

A further object of the present invention is to provide a laser scanning system which includes an optical-frequency modulator and a liquid crystal plate which is inserted into between polarized light plates placed at an angle equal in the polarized light direction, and the level of voltage can be controlled so that the contrast, brightness, and color can be controlled and adjusted for forming the three-dimensional color image on a screen. Therefore, the viewer can view the three-dimensional color image on the screen through viewer's polarized glasses.

Other objects and further scope of applicability of the present invention will become apparent from the detailed description given below. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a laser scanning system which comprises a red light emitting member, a green light emitting member, a blue light emitting member, a scanning light member, and a controlling member. The red, green, and blue emitting light members include an optical-frequency modulator and a liquid crystal plate placed between polarized light plates which are disposed at an angle equal in the polarized light direction, whereby the viewer can use polarized glasses to view a three-dimensional color image produced by the laser scanning system on a screen.

BRIEF DESCRIPTION OF THE DRAWINGS

The present invention will become more fully understood form the detailed description given hereinbelow and the accompanying drawings which are given by way of illustration only, and thus are not limitative of the present invention, and wherein.

DESCRIPTION OF THE PREFERRED EMBODIMENTS

Figure 1:
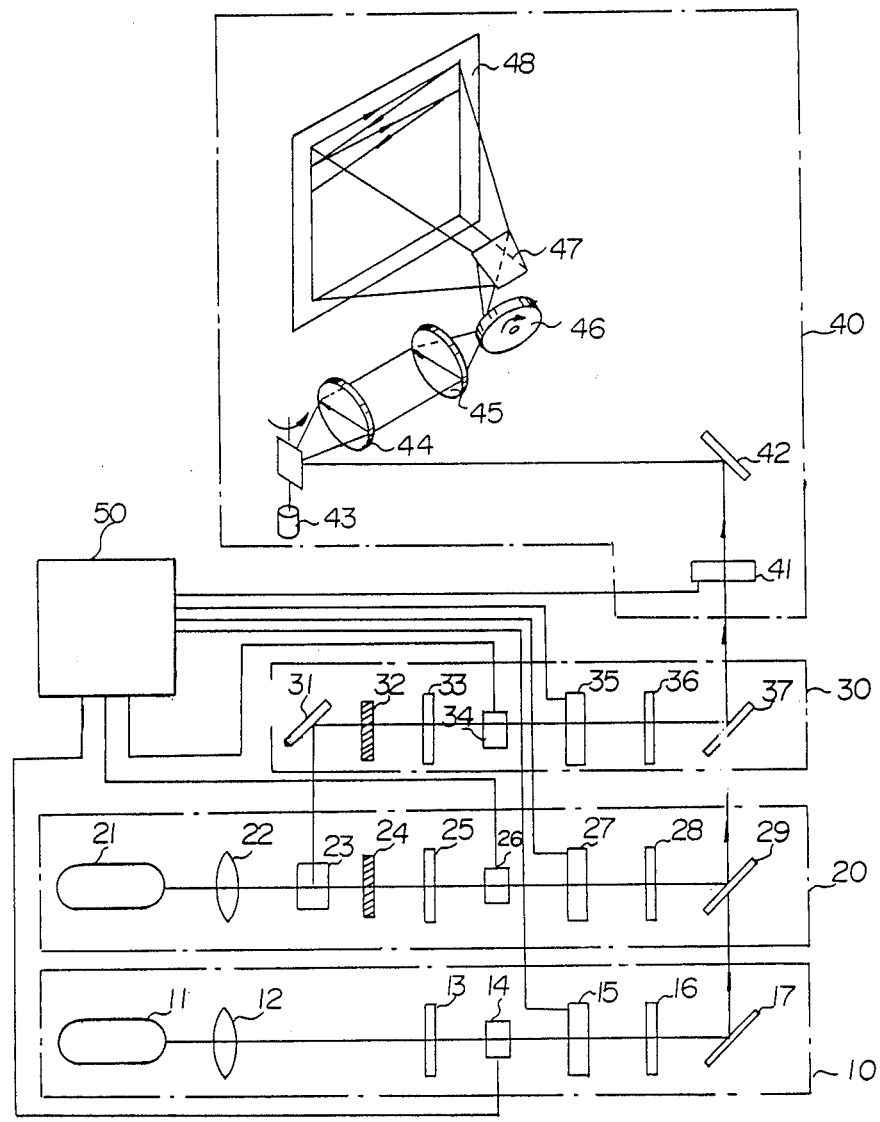
FIG. 1 is a circuit illustrating a laser scanning system according to the present invention.

Referring now in detail to the drawings for the purpose of illustrating the preferred embodiments of the present invention, the laser scanning system for displaying a three-dimensional color image as shown in FIG. 1 comprises a red light emitting member 10, a green light emitting member 20, a blue light emitting member 30, a scanning light member 40, and a controller 50.

The red light emitting member 10 includes a helium-neon laser 11, a collimator 12, a first polarized light plate 13, an optical-frequency modulator 14, a liquid crystal plate 15, a second polarized light plate 16, and a reflecting mirror 17 disposed in a line therein for generating and emitting red light.

The green light emitting member 20 includes an argon laser 21, a collimator 22, a beam splitter 23, a green filter 24, a first polarized light plate 25, an optical-frequency modulator 26, a liquid crystal plate 27, a second polarized light plate 28, and a special wavelength reflecting mirror 29 disposed in a line therein for generating and emitting green light.

The blue light emitting member 30 includes a reflecting mirror 31, a blue filter 32, a first polarized light plate 33, an optical-frequency modulator 34, a liquid crystal plate 35, a second polarized light plate 36, and a special wavelength reflecting mirror 37 disposed in a line therein for generating and emitting blue light through the laser beam reflected from the beam splitter 23 of the green light emitting member 20.

The scanning light member 40 includes a liquid crystal plate 41, a first reflecting mirror 42, a galvanometer 43, a first lens 44, a second lens 45, a rotating mirror 46, and a second reflecting mirror 47 for scanning the laser beam onto a screen 48. The laser beam is composed of light from the reflecting mirror 17 of the red light emitting member 10, the special wavelength reflecting mirror 29 of the green light emitting member 20, and the special wavelength reflecting mirror 37 of the blue light emitting member 30.

The controller 50 substantially controls the optical-frequency modulators 14, 26, 34 and the liquid crystal plates 15, 27, 35, 41.

Figure 2:
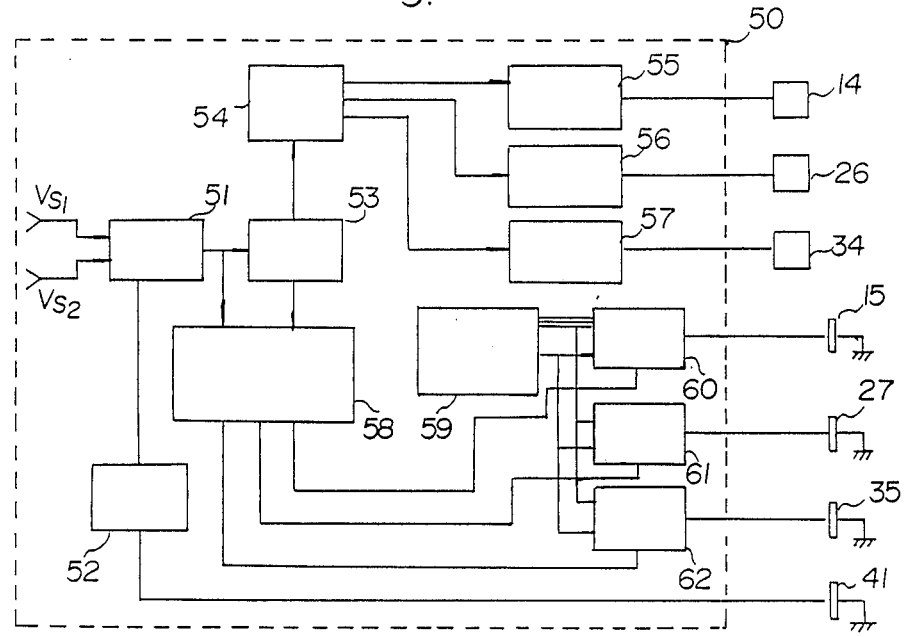
FIG. 2 is a circuit illustrating a controller according to the present invention.

Referring to FIG. 2 of the drawings, there is shown a circuit illustrating the controller 50. The controller 50 includes an image signal reflector 51 for selecting from image signals $VS_1$ and $VS_2$; a voltage supply 52 for the liquid crystal plate 41 according to the input signal selected by the image signal selector 51; a color signal generator 53 for transmitting the color signal according to a signal received from the image signal selector 51; a laser selector 54 for selecting the laser according to the color signal from the color signal generator 53; and first, second, and third high frequency generators 55, 56, and 57 for generating high frequency signals according to a signal from the laser selector 54 which control the optical-frequency modulators 14, 26, and 34. The controller 50 further includes a contrast, brightness, and color controller 58 for controlling the contrast, brightness, and color according to signals from the image signal selector 51 and color signal generator 53. The color controller 58 controls the contrast, brightness, and color by controlling the operations of the first, second, and third voltage selectors 60, 61, and 62 which select the voltage from a multivoltage generator 59 and transmits this voltage to the liquid crystal plates 15, 27, and 35. The first polarized light plates 13, 25, and 33 are orientated such they have the same polarizing direction and the second polarized light plates 16, 28, and 36 are orientated at right angles to the first polarized light plates 13, 25, and 33, respectively.

Figure 3:
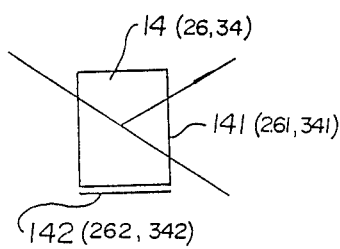
FIG. 3 shows an optical-frequency modulator according to the present invention.

As shown in FIG. 3, the optical-frequency modulators 14, 26, and 34, contain main body members 141, 261, and 341, respectively. The main body members 141, 261, and 341 are provided with transducers 142, 262, and 342 disposed under the main body members for refracting the laser beam through the high frequency which is created according to the high frequency generators 55, 56, and 57 (FIG. 2).

Figure 4:
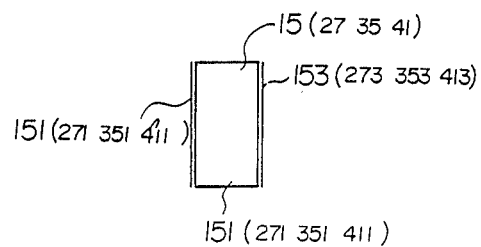
FIG. 4 shows a liquid crystal plate according to the present invention.

As shown in FIG. 4, the liquid crystal plates, 15, 27, 35, and 41, contains liquid crystals 151, 271, 351, and 411, respectively. The liquid crystals 151, 271, 351, and 411, have transparent electrodes 152, 272, 352, and 412 and 153, 273, 353, and 413 attached to both sides of the liquid crystals. The transparent electrodes 152, 272, 352, and 412 are connected to ground and the other transparent electrodes 153, 273, 353, and 413 are connected to the voltage selectors 60, 61, and 62 (FIG. 2).

Figure 5:
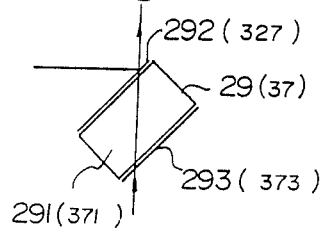
FIG. 5 shows a wavelength specific reflector according to the present invention.

As shown in FIG. 5, the special wavelength reflecting mirrors 29 and 37 contain main body members 291 and 371, respectively. The main body members 291 and 371 both have front and rear sides, respectively. The front side is coated with reflecting plates 292 and 372 and the rear side is coated with as non-reflecting plates 293 and 373, respectively.

According to the present invention, the laser scanning system operates as follows:

When the image signals $VS_1$ and $VS_2$ are generated from a photograph taken by two cameras in a mutually opposite direction are inputted into the image signal selector 51, the image signal selector 51 selects one of the two image signals $VS_1$ or $VS_2$, and simultaneously controls the voltage supply 52 and the supply of voltage to the liquid crystal plate 41. Also the laser selector 54 controls the high frequency generators 55, 56, and 57 transmission of high frequency to the optical-frequency modulators 14, 26, and 34 and selects the laser beam for displaying red, green, or blue color because the image signal selector 51 controls the laser selector 54 through the color signal generator 53. That is, when the high frequency generators 55, 56, and 57 provide high frequency to the transducers 142, 262, and 342 of the optical-frequency modulators 14, 26, and 34, the main body members 141, 251, and 341 include portions which have large and small refractive indexes to refract the inputted laser beam. When high frequency is not provided, the laser beam will be not refracted and will pass through the liquid plate 15 and second polarized light plate 16 and be reflected by the reflecting mirror 17, thereby allowing red light to be transmitted. Also the green and blue light from the argon laser can be transmitted in a similar fashion by controlling of the optical-frequency modulators 26 and 34.

The image signal selector 51 controls the contrast, brightness and color controller 58 through the color signal generator 53 so that the contrast, brightness, and color are controlled and adjusted. The contrast, brightness and color controller 58 in turn controls the electric pressure selectors 60, 61, and 62 which select the desired voltage from multivoltage generator 59 and transmits this voltage to the liquid crystal plates 15, 27, and 35. Therefore, when the voltage is transmitted to the liquid crystal plates 15, 27, and 35, the laser beam is polarized to the same polarized direction as the polarized light plates 13, 25, and 33. The laser beam after passing through the optical-frequency modulators 14, 26, and 34 passes through the liquid crystal plates 15, 29, and 35. These liquid crystal plates suddenly rotate the polarized direction of the laser beam. At this time, the extent of the rotation of the laser beam depends on the voltage present across the liquid crystal plates 15, 26, and 35. When the polarized light direction is rotated such that its direction is equal to the polarized light direction of the polarized light plates 16, 28, and 36, a large quantity of laser beam passes through the polarized light plates 16, 28, and 36. Therefore, a plurality of colors are obtained by selecting the laser beam of red, green, and blue through the use of the optical-frequency modulators 14, 26, and 34 and by controlling the quantity of the laser beam passing through the liquid crystal plates 15, 27, and 35.

Thus the laser beam having colors produced by above-mentioned manner is transmitted to the liquid crystal plate 41 through reflecting mirror 17 and special reflecting wavelength mirrors 29 and 37. The three-dimensional image of the liquid crystal plate 41 is produced by repeatively polarizing the light direction of the laser beam in a direction equal to or at a right angle to the polarized light direction of the polarized light plates 16, 28, and 36.

On the other hand, when the voltage is present across the liquid crystal plate 41, the polarized light direction of the laser beam is rotated by an angle of 90°. When the voltage is not present across the liquid crystal plate 41, the polarized light direction of the laser beam is not rotated. Thus the laser beam which has passed through the liquid crystal plate 41 is scanned by the reflecting mirror 42, galvanometer 43, lenses 44 and 45, rotating mirror 46, and second reflecting mirror 47, thereby reading a polarized image on the screen 48. The viewers can then use polarized glasses to view the three-dimensional image easily. Thus the system of the present invention relates to displaying a three-dimensional image on the screen by using a laser scanning mechanism.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A laser scanning system for displaying a three-dimensional color image on a screen, comprising:
   red light emitting means for generating red light;
   said red light emitting means including;
   a helium-neon laser;
   a first collimator;
   a first polarized light plate;

a first optical-frequency modulator;
a first liquid crystal plate;
a second polarized light plate; and
a first reflecting mirror;
green light emitting means for generating green light;
said green light emitting means including;
   an argon laser;
   a second collimator;
   a beam splitter;
   a green filter;
   a third polarized light plate;
   a second optical-frequency modulator;
   a second liquid crystal plate;
   a fourth polarized light plate; and
   a first special wavelength reflecting mirror;
blue light emitting means for generating blue light;
said blue light emitting means including;
   a reflecting mirror;
   a blue filter;
   a fifth polarized light plate;
   a third optical-frequency modulator;
   a third liquid crystal plate;
   a sixth polarized light plate; and
   a second special wavelength reflecting mirror;
said red light emitting means, said green light emitting means, and said blue light emitting means producing a laser beam;
scanning means for scanning said laser beam produced by said red light emitting means, said green light emitting means, and said blue light emitting means including;
   a fourth liquid crystal plate;
   a second reflecting mirror;
   a galvanometer;
   a first lens;
   a second lens;
   a rotating mirror;
   a third reflecting mirror; and
controller means for controlling said first, second, and third optical-frequency modulators and said first, second, and third liquid crystal plates to a three-dimensional color image on the screen.

2. The laser scanning system as claimed in claim 1, wherein said first, third, and fifth polarized light plates are at a right angle to said second, fourth, and sixth polarized light plates, respectively.

3. The laser scanning system as claimed in claim 1, wherein said first, second, and third optical-frequency modulators and said first, second, and third liquid crysal plate control contrast, brightness, and color of the three-dimensional color image on the screen.

4. The laser scanning system as claimed in claim 1, wherein said fourth liquid crystal plate polarizes in a vertical direction with respect to a polarized direction of said second, fourth, and sixth polarized light plates when voltage is applied.

5. The laser scanning system as claimed in claim 1, wherein said first and second wavelength reflecting mirrors each have a front side and a rear side, said front side and said rear side being coated with a reflecting plate and a non-reflecting plate, respectively, for transmitting the laser beam produced by said red, green, and blue light emitting means to said fourth liquid crystal plate.

* * * * *